(12) United States Patent
Fukuda et al.

(10) Patent No.: US 8,652,635 B2
(45) Date of Patent: Feb. 18, 2014

(54) INSULATED WIRE AND RESIN DISPERSION

(75) Inventors: Hideo Fukuda, Tokyo (JP); Yong Hoon Kim, Tokyo (JP); Tadashi Ishii, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/137,367

(22) Filed: May 26, 2005

(65) Prior Publication Data

US 2005/0266243 A1    Dec. 1, 2005

(30) Foreign Application Priority Data

Nov. 29, 2002  (JP) .................................. 2002-348765
Nov. 27, 2003  (WO) ........................ PCT/JP03/15151

(51) Int. Cl.
*B32B 15/02* (2006.01)
*H01B 7/17* (2006.01)

(52) U.S. Cl.
USPC ........ 428/379; 428/375; 428/373; 174/110 R; 174/110 SR; 174/110 PM

(58) Field of Classification Search
None
See application file for complete search history.

(56) References Cited

U.S. PATENT DOCUMENTS

| | | | | |
|---|---|---|---|---|
| 2,871,222 A * | 1/1959 | Finestone | .......................... | 528/8 |
| 3,562,200 A | 2/1971 | Jones et al. | | |
| 3,585,255 A | 6/1971 | Sevenich | | |
| 3,777,198 A * | 12/1973 | Anderson et al. | ............. | 310/200 |
| 4,039,415 A * | 8/1977 | Shibayama et al. | ........... | 204/488 |
| 4,172,859 A * | 10/1979 | Epstein | .......................... | 428/402 |
| 4,252,842 A * | 2/1981 | Jung et al. | ...................... | 427/117 |
| 4,384,946 A * | 5/1983 | Patzschke et al. | ............. | 204/501 |
| 4,476,261 A * | 10/1984 | Patzschke et al. | ............. | 204/496 |
| 4,612,246 A * | 9/1986 | Goldberg et al. | ............. | 428/379 |
| 5,436,296 A * | 7/1995 | Swamikannu et al. | ........ | 525/166 |
| 5,606,152 A * | 2/1997 | Higashiura et al. | ....... | 174/120 R |
| 6,222,132 B1 * | 4/2001 | Higashiura et al. | ....... | 174/120 R |
| 7,541,544 B2 * | 6/2009 | Inoue et al. | ................ | 174/110 R |
| 2005/0252679 A1 * | 11/2005 | Chang et al. | .............. | 174/120 R |

FOREIGN PATENT DOCUMENTS

| | | |
|---|---|---|
| JP | 58-147902 A | 9/1983 |
| JP | 1-175106 A | 7/1989 |
| JP | 01-242618 A | 9/1989 |
| JP | 07-196859 | 8/1995 |
| JP | 11-53946 A | 2/1999 |
| JP | 11-181116 A | 7/1999 |
| JP | 2000-322934 A | 11/2000 |
| JP | 2001-93340 A | 4/2001 |
| JP | 2002-63984 A | 2/2002 |
| JP | 2002-64030 A | 2/2002 |

OTHER PUBLICATIONS

Tomohiro Kuramochi et al.; Hikessho Copolyester eno Acryl Gomu no Yoyu Blend Koka; Journal of the Society of Rubber Industry, Japan, vol. 75, No. 5, pp. 70-71, 2002.

* cited by examiner

*Primary Examiner* — Jill Gray

(74) *Attorney, Agent, or Firm* — Birch, Stewart, Kolasch & Birch, LLP

(57) ABSTRACT

An insulated wire, which is coated, on a conductor, with a thin-film insulating layer composed of a resin dispersion, wherein the resin dispersion contains:

a polyester-series resin (A) in a continuous phase; and a resin (B) having a functional group capable of reacting with the polyester-series resin, and, if necessary, an olefin-series resin (C), in a dispersed phase; and the resin dispersion.

12 Claims, No Drawings

INSULATED WIRE AND RESIN DISPERSION

TECHNICAL FIELD

The present invention relates to an insulated wire.

Further, the present invention relates to a resin dispersion which can be used, for example, in a coating layer of the insulated wire. Further, the present invention relates to a molded product which is obtained from the resin dispersion.

BACKGROUND ART

Regarding an insulated wire obtained by extrusion-coating a linear polyester resin composed of an aromatic dicarboxylic acid residue and an aliphatic glycol, such as a polyethylene terephthalate resin (hereinafter, referred to as PET) or a polybutylene terephthalate resin, if the insulated wire is left under the environment of a temperature at 30° C. or more, degradation of dielectric breakdown voltage caused by occurrence of crazing is confirmed. As means for solving this problem, there is proposed that a stable dielectric breakdown voltage of an insulated wire is obtained, by blending 1 to 15% by mass of an ethylene-series copolymer containing a carboxylic acid having good compatibility with the polyester-series resin.

However, with the recent tendency of the miniaturization of electric and electronic machinery and tools, there is a need for improvement of electric insulation properties under high-temperature environment as heat generation or heat release properties are deteriorated due to their components. With respect to this, an insulated wire obtained by extrusion-coating a conventional polyester resin cannot sufficiently satisfy the above need.

Other and further features and advantages of the invention will appear more fully from the following description.

DISCLOSURE OF INVENTION

The present invention resides in an insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, in a dispersed phase.

Further, the present invention resides in an insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin and dispersed with an average particle diameter of 0.05 to 3 µm in the resin (A).

Further, the present invention resides in an insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, and an olefin-series resin (C), in a dispersed phase.

Further, the present invention resides in an insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, and an olefin-series resin (C), each of which is dispersed with an average particle diameter of 0.05 to 3 µm in the resin (A).

Further, the present invention resides in a resin dispersion, comprising:
  a polyester-series resin (A) in a continuous phase; and
  a resin (B) having a functional group capable of reacting with the polyester-series resin, in a dispersed phase.

Further, the present invention resides in a resin dispersion, comprising:
  a polyester-series resin (A) in a continuous phase; and
  a resin (B) having a functional group capable of reacting with the polyester-series resin and dispersed with an average particle diameter of 0.05 to 3 µm in the resin (A).

Further, the present invention resides in a resin dispersion, comprising:
  a polyester-series resin (A) in a continuous phase; and
  a resin (B) having a functional group capable of reacting with the polyester-series resin, and an olefin-series resin (C), in a dispersed phase.

Further, the present invention resides in a resin dispersion, comprising:
  a polyester-series resin (A) in a continuous phase; and
  a resin (B) having a functional group capable of reacting with the polyester-series resin, and an olefin-series resin (C), each of which is dispersed with an average particle diameter of 0.05 to 3 µm in the resin (A).

BEST MODE FOR CARRYING OUT THE INVENTION

According to the present invention, there are provided the following means:

(1) An insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, in a dispersed phase.

(2) An insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin and dispersed with an average particle diameter of 0.05 to 3 µm in the resin (A).

(3) The insulated wire according to the above (1) or (2), wherein the resin dispersion contains 1 to 20 mass parts of the resin (B), to 100 mass parts of the polyester-series resin (A).

(4) An insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, and an olefin-series resin (C), in a dispersed phase.

(5) An insulated wire, which is coated, on a conductor, with a thin-film insulating layer composed of a resin dispersion,
  wherein the resin dispersion comprises:
  a polyester-series resin (A) in a continuous phase; and
  a resin (B) having a functional group capable of reacting with the polyester-series resin, and an olefin-series resin (C), each of which is dispersed with an average particle diameter of 0.05 to 3 µm in the resin (A).

(6) The insulated wire according to the above (4) or (5), wherein the resin dispersion contains 1 to 20 mass parts of the resin (B), and 0 to 20 mass parts of the olefin-series resin (C), to 100 mass parts of the polyester-series resin (A).

(7) The insulated wire according to the above (4) or (5), wherein the resin dispersion contains 1 to 10 mass parts of the resin (B), and 0 to 10 mass parts of the olefin-series resin (C), to 100 mass parts of the polyester-series resin (A).

(8) The insulated wire according to any one of the above (1) to (7), wherein the polyester-series resin (A) is a polymer obtained by condensation reaction of a dicarboxylic acid with a diol.

(9) The insulated wire according to any one of the above (1) to (7), wherein the resin (B) is a resin containing at least one functional group selected from the group consisting of an epoxy group, an oxazolyl group, an amino group, and a maleic anhydride residue.

(10) The insulated wire according to any one of the above (1) to (7), wherein the resin (B) is a copolymer composed of an olefin component and an epoxy group-containing compound component.

(11) The insulated wire according to any one of the above (1) to (7), wherein the resin (B) is a copolymer composed of an olefin component and an unsaturated carboxylic acid glycidyl ester component.

(12) The insulated wire according to any one of the above (1) to (7), wherein the resin (B) is a copolymer composed of at least one component selected from the group consisting of an acrylic component and a vinyl component; an olefin component, and an epoxy group-containing compound component.

(13) The insulated wire according to any one of the above (1) to (7), wherein the resin (B) is a copolymer composed of at least one component selected from the group consisting of an acrylic component and a vinyl component; an olefin component, and an unsaturated carboxylic acid glycidyl ester component.

(14) The insulated wire according to any one of the above (4) to (7), wherein the olefin-series resin (C) is a copolymer composed of at least one component selected from the group consisting of an acrylic component and a vinyl component; and an olefin component.

(15) A resin dispersion, comprising:
a polyester-series resin (A) in a continuous phase; and
a resin (B) having a functional group capable of reacting with the polyester-series resin, in a dispersed phase.

(16) A resin dispersion, comprising:
a polyester-series resin (A) in a continuous phase; and
a resin (B) having a functional group capable of reacting with the polyester-series resin and dispersed with an average particle diameter of 0.05 to 3 µm in the resin (A).

(17) The resin dispersion according to the above (15) or (16), which contains 1 to 10 mass parts of the resin (B), to 100 mass parts of the polyester-series resin (A).

(18) A resin dispersion, comprising:
a polyester-series resin (A) in a continuous phase; and
a resin (B) having a functional group capable of reacting with the polyester-series resin, and an olefin-series resin (C), in a dispersed phase.

(19) A resin dispersion, comprising:
a polyester-series resin (A) in a continuous phase; and
a resin (B) having a functional group capable of reacting with the polyester-series resin, and an olefin-series resin (C), each of which is dispersed with an average particle diameter of 0.05 to 3 µm in the resin (A).

(20) The resin dispersion according to the above (18) or (19), which contains 1 to 10 mass parts of the resin (B), and 0 to 10 mass parts of the olefin-series resin (C), to 100 mass parts of the polyester-series resin (A).

(21) The resin dispersion according to any one of the above (15) to (20), wherein the polyester-series resin (A) is a polymer obtained by condensation reaction of a dicarboxylic acid with a diol.

(22) The resin dispersion according to any one of the above (15) to (20), wherein the resin (B) is a resin containing at least one functional group selected from the group consisting of an epoxy group, an oxazolyl group, an amino group, and a maleic anhydride residue.

(23) The resin dispersion according to any one of the above (15) to (20), wherein the resin (B) is a copolymer composed of an olefin component and an epoxy group-containing compound component.

(24) The resin dispersion according to any one of the above (15) to (20), wherein the resin (B) is a copolymer composed of an olefin component and an unsaturated carboxylic acid glycidyl ester component.

(25) The resin dispersion according to any one of the above (15) to (20), wherein the resin (B) is a copolymer composed of at least one component selected from the group consisting of an acrylic component and a vinyl component; an olefin component, and an epoxy group-containing compound component.

(26) The resin dispersion according to any one of the above (15) to (20), wherein the resin (B) is a copolymer composed of at least one component selected from the group consisting of an acrylic component and a vinyl component; an olefin component, and an unsaturated carboxylic acid glycidyl ester component.

(27) The resin dispersion according to any one of the above (15) to (20), wherein the olefin-series resin (C) is a copolymer composed of at least one component selected from the group consisting of an acrylic component and a vinyl component; and an olefin component.

The present invention is explained in detail below.

The thin-film insulating layer in the insulated wire of the present invention is composed of the resin dispersion, which comprises the component (A) in the continuous phase and the component (B) in the dispersed phase, the component (B) in the resin dispersion being uniformly and finely dispersed in the component (A) by chemical reaction in a process, for example, of melting and mixing the polyester-series resin (A) and the resin (B) containing the functional group. It is assumed that the resin dispersion of the present invention can further form a partial cross-linked structure during the course of formation of a new block or graft copolymer. Accordingly, it is assumed that such a resin dispersion can suppress degradation of dielectric breakdown voltage caused by occurrence of crazing without degrading the heat resistance of polyester-series resin, and it can also inhibit degradation of electric insulating property under a high temperature.

Preferably, the polyester-series resin (A) that can be used in the present invention is a polymer obtained by condensation reaction of a dicarboxylic acid with a diol.

Examples of the carboxylic acid component to constitute the resin (A) includes aromatic dicarboxylic acids, such as terephtalic acid, isophthalic acid, naphthalene dicarboxylic acid, diphenyldicarboxylic acid, diphenylsulfondicaboxylic acid, diphenyletherdicarboxylic acid, or an alkyl ester or acid halide thereof, bis(p-carboxyphenyl)methane, 4,4'-sulfonyldibenzoic acid; aliphatic dicarboxylic acids, such as adipic acid, azelaic acid, and sebacic acid; and the like. The dicarboxylic acid may be a mixture of two or more kinds thereof.

Examples of the diol component includes ethylene glycol, propylene glycol, tetramethylene glycol, pentamethylene glycol, 2,2-dimethyltrimethylene glycol, hexamethylene glycol, decamethylene glycol, p-xylene glycol, cyclohexanedimethanol, poly(ethtyleneoxide) glycol, poly(1,2-propyleneoxide) glycol, poly(1,3-propyleneoxide) glycol, poly(tetramethyleneoxide) glycol, and the like. The diol may be a mixture of two or more kinds thereof.

Representative examples of the polyester-series resin (A) include polybutylene terephthalate, polyethylene terephthalate, polyethylene naphthalate, polybutylene naphthalate, as well as copolymer polyesters, such as polyethylene isophthalate/terephthalate, polybutylene isophthalate/terephthalate, polyethylene terephthalate/naphthalate, polybutylene terephthalate/naphthalate, and the like. Especially, polyethylene terephthalate resin is preferable. There are commercially available resins including, for example, Vylopet (trade name, manufactured by Toyobo Co., Ltd.), Bellpet (trade name, manufactured by Kanebo, Ltd.), and Teijin PET (trade name, manufactured by Teijin Ltd.). The polyester-series resin (A) may be a single component or a mixture of two or more kinds thereof.

The resin (B) for use in the present invention contains preferably at least one group selected from the group consisting of an epoxy group, an oxazolyl group, an amino group, and a maleic acid anhydride residual group, as the functional group having reactivity with the polyester-series resin, and it particularly preferably contains an epoxy group. The resin (B) preferably has 0.05 to 30 mass parts of monomer component containing this functional group in one molecule, more preferably 0.1 to 20 mass parts thereof. If the amount of such a functional group-containing monomer component is too small, it is difficult to exhibit the effects of the present invention. On the other hand, if too large, it is likely to generate a product in gel state by an excess reaction of the monomer component with the polyester-series resin (A), which is non-preferable.

As the resin (B), a copolymer composed of an olefin component and an epoxy-group-containing compound component is preferable. The resin (B) may be a copolymer composed of at least one component among an acrylic component and a vinyl component; an olefin component, and an epoxy-group-containing compound component.

Examples of the olefin component to constitute the copolymer (B) include ethylene, propylene, butene-1, pentene-1,4-methylpentene-1, isobutylene, hexene-1, decene-1, octene-1, 1,4-hexadiene, dicyclopentadiene, and the like. Preferably, use can be made of ethylene, propylene and butene-1. These components can be used singly or in combination of two or more kinds thereof.

Further, examples of the acrylic component include acrylic acid, methyl acrylate, ethyl acrylate, n-propyl acrylate, isopropyl acrylate, n-butyl acrylate, t-butyl acrylate, isobutyl acrylate, methyl methacrylate, ethyl methacrylate, butyl methacrylate, and the like. Examples of the vinyl component include vinyl acetate, vinyl propionate, vinyl butyrate, vinyl chloride, vinyl alcohol, styrene, and the like. Among these, methyl acrylate and methyl methacrylate are preferable. Further, these components can be used singly or in combination of two or more kinds thereof.

As the epoxy-group-containing compound to constitute the copolymer (B), for example, a glycidyl ester compound of an unsaturated carboxylic acid, represented by the following formula (1), can be mentioned:

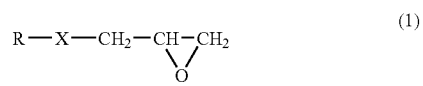

wherein R represents an alkenyl group having 2 to 18 carbon atoms, and X represents a carbonyloxy group.

Representative examples of the unsaturated carboxylic acid glycidyl ester include glycidyl acrylate, glycidyl methacrylate, itaconic acid glycidyl ester, and the like, preferably it is glycidyl methacrylate.

Representative examples of the above copolymer (B) include an ethylene/glycidyl methacrylate copolymer, an ethylene/glycidyl methacrylate/methyl acrylate terpolymer, an ethylene/glycidyl methacrylate/vinyl acetate terpolymer, an ethylene/glycidyl methacrylate/methyl acrylate/vinyl acetate quarterpolymer, and the like. Of these, an ethylene/glycidyl methacrylate copolymer, an ethylene/glycidyl methacrylate/methyl acrylate terpolymer are preferable. There are commercially available resins including, for example, Bondfast (trade name, manufactured by Sumitomo Chemical Co., Ltd.) and LOTADER (trade name, manufactured by ATOFINA Chemicals, Inc.).

Further, the copolymer (B) for use in the present invention may be any of a block copolymer, a graft copolymer, a random copolymer, or an alternating copolymer. The resin (B) may be a partially epoxidated product of a diene component of the following copolymers, or a graft-modified product of the following copolymers with an epoxy-containing compound such as glycidyl methacrylic acid. Examples of the above-mentioned copolymers include a random copolymer of ethylene/propylene/diene, a block copolymer of ethylene/diene/ethylene, a block copolymer of propylene/diene/propylene, a block copolymer of styrene/diene/ethylene, a block copolymer of styrene/diene/propylene, and a block copolymer of styrene/diene/styrene. Further, preferable examples of these copolymers also include hydrogenated products of the copolymers, in order to enhance heat stability.

In the present invention, the content of the copolymer (B) is preferably 1 to 20 mass parts, more preferably 1 to 10 mass parts, to 100 mass parts of the polyester-series resin (A). If this content is too small, it is difficult to exhibit the effects of the present invention. On the other hand, if too large, heat resistance is apt to be degraded, which is non-preferable.

Further, the olefin-series resin (C) having good compatibility with the resin (B) may be added within a range of not losing the effects of the present invention.

In the present invention, the olefin-series resin (C) is preferably an olefin homopolymer or an olefin-series copolymer. The resin (C) may be a copolymer containing at least one kind of a vinyl component or an acrylic component capable of copolymerizing with olefin.

Examples of the olefin component in the olefin-series resin (C) include ethylene, propylene, butene-1, pentene-1,4-methylpentene-1, isobutylene, hexene-1, decene-1, octene-1,1,4-hexadiene, dicyclopentadiene, and the like. Preferably, use can be made of ethylene, propylene, and butene-1. Further, these olefin components can be used alone or in combination of two or more kinds thereof.

Further, examples of the acrylic component include acrylic acid, methyl acrylate, ethyl acrylate, n-propyl acrylate, isopropyl acrylate, n-butyl acrylate, t-butyl acrylate, isobutyl acrylate, methyl methacrylate, ethyl methacrylic, butyl methacrylate, and the like. Examples of the vinyl component include vinyl acetate, vinyl propionate, vinyl butyrate, vinyl chloride, vinyl alcohol, styrene, and the like. Among these, methyl acrylate and methyl methacrylate are preferable. Further, these components can be used alone or in combination of two or more kinds thereof.

Representative examples of the olefin-series resin (C) include homopolymers of, for example, polyethylene, polypropylene, polybutene-1, and polyisobutylene; copolymers of, for example, ethylene/propylene, ethylene/propylene/diene, ethylene/methyl methacrylate, ethylene/vinyl acetate, and ethylene/methyl methacrylate/vinyl acetate; block copolymers, for example, of ethylene/diene/ethylene, propylene/diene/propylene, styrene/diene/ethylene, and styrene/diene/propylene, styrene/diene/styrene; or hydrogenated resins thereof. Among these, an ethylene/methyl methacrylate copolymer is preferably used. There are commercially available resins including, for example, Acryft (trade name, manufactured by Sumitomo Co., Ltd.) and Rotoryl (trade name, manufactured by ATOFINA Chemicals, Inc.).

In the present invention, the content of the olefin-series resin (C) is preferably 0 to 20 mass parts, more preferably 0 to 10 mass parts, to 100 mass parts of the polyester-series resin (A). The ratio of the copolymer (B) to the olefin-series resin (C) is generally from about (5:95) to about (10:0), preferably from about (10:90) to about (100:0), by mass.

The size of dispersed particles of the copolymer (B) and olefin-series resin (C) in the dispersed phase is not particularly limited, and it is preferably 0.05 to 3 μm in an average particle diameter, more preferably 0.1 to 2.0 μm in an average particle diameter.

Further, the resin dispersion of the present invention can be obtained by melting and blending the polyester-series resin (A), the copolymer (B), and, if necessary, the olefin-series resin (C), by using a usual mixer, such as a twin screw extruder and a co-kneader. The blending method may be a method for blending the resin (A) and the resin (B), and further, optionally, the resin (C), simultaneously; or a method for firstly melting and blending the resin (B), and the resin (C) if needed, and then sequentially blending the resulting resin mixture with the resin (A). Further, an inorganic filler, for example, talc, titanium dioxide, aluminum hydroxide, zinc oxide, and silica powder, can be added to the resin dispersion, within a range not losing fundamental characteristics of the resin dispersion required for winding wires. By adding the inorganic filler, it is also possible to enhance high-frequency property of the resultant resin dispersion.

Further, as required, a lubricant, for example, stearic acids, waxes, and low-molecular weight polyethylenes; or a coloring agent, can be added to the resin dispersion. By adding the lubricant, it is also possible to improve processability including decrease of conductor tensile strength during extrusion-coating a thin film.

In the present invention, the thickness of one thin-film insulating layer is not particularly restricted, and it is preferably 10 to 100 μm, more preferably 20 to 60 μm.

Further, in the present invention, in order to strengthen mechanical properties, two or three coating layers of a polyamide-series resin can be applied on the side of the outer periphery of one or two coating layer(s) formed with a thin-film layer composed of the resin dispersion of the present invention. In this case, examples of the polyamide resin include 6,6-nylon, 6-nylon, 6,10-nylon, polyhexamethylene terephthalamide, polynonamethylene terephthalamide, and the like.

The insulated wire of the present invention can suppress degradation of dielectric breakdown voltage caused by occurrence of crazing, with the passage of time, and it is excellent in heat resistance and high-temperature insulating properties.

Further, according to the resin dispersion of the present invention, no formation of granular structure (spitting), during extrusion-molding process, is caused, and an extrusion-molded product excellent in quality of surface can be obtained.

The present invention will be described in more detail based on examples given below, but the present invention is not meant to be limited by these examples.

EXAMPLES

The resin dispersions in the examples below each were obtained by mixing components thereof using a 30-mmϕ twin-screw extruder for kneading.

Example 1

To 100 mass parts of PET (trade name: TR-8550, manufactured by Teijin Chemicals Ltd.), 2 mass parts of an ethylene/glycidyl methacrylate/methyl acrylate copolymer resin (trade name: Bondfast 7M, manufactured by Sumitomo Chemical Co., Ltd., glycidyl methacrylate=6 mass %) were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.14 μm).

The thus-obtained resin dispersion was extruded to coat, onto a 0.4-mmϕ copper wire preheated at 180° C., using a 30-mmϕ extruder (extrusion condition: 210 to 280° C.), to obtain an insulated wire of the present invention.

Example 2

To 100 mass parts of the PET, 5 mass parts of the ethylene/glycidyl methacrylate/methyl acrylate copolymer resin were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.18 μm).

An insulated wire of the present invention was obtained in the same manner as in Example 1, except that the thus-obtained resin dispersion was used.

Example 3

To 100 mass parts of the PET, 10 mass parts of the ethylene/glycidyl methacrylate/methyl acrylate copolymer resin were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.24 μm).

An insulated wire of the present invention was obtained in the same manner as in Example 1, except that the thus-obtained resin dispersion was used.

Example 4

To 100 mass parts of the PET, 10 mass parts of the ethylene/glycidyl methacrylate/methyl acrylate copolymer resin were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.24 μm).

An insulated wire of the present invention was obtained by coating with the thus-obtained resin dispersion, onto a stranded wire composed of 7 insulated core wires, each made by coating a copper wire of 0.15 mm diameter with Insulating Varnish WD-4305 (trade name, manufactured by Hitachi Chemical Co., Ltd.) at a thickness of 8 μm.

Example 5

To 100 mass parts of the PET, 15 mass parts of the ethylene/glycidyl methacrylate/methyl acrylate copolymer were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.29 μm).

An insulated wire of the present invention was obtained in the same manner as in Example 1, except that the thus-obtained resin dispersion was used.

Example 6

To 100 mass parts of the PET, 20 mass parts of the ethylene/glycidyl methacrylate/methyl acrylate copolymer resin were added and mixed together as mentioned in the above, to obtain a resin dispersion, in which the PET was in a continuous phase and the ethylene/glycidyl methacrylate/methyl acrylate copolymer was in a dispersed phase (the average diameter of dispersed particles: 0.35 μm).

An insulated wire of the present invention was obtained in the same manner as in Example 1, except that the thus-obtained resin dispersion was used.

Example 7

To 100 mass parts of the PET, 5 mass parts of an ethylene/glycidyl methacrylate copolymer (trade name: Bondfast E, manufactured by Sumitomo Chemical Co., Ltd., glycidyl methacrylate=12 mass %) were added and mixed together as mentioned in the above, to obtain a resin dispersion, in which the PET was in a continuous phase and the ethylene/glycidyl methacrylate copolymer was in a dispersed phase (the average diameter of dispersed particles: 0.16 μm).

An insulated wire of the present invention was obtained in the same manner as in Example 1, except that the thus-obtained resin dispersion was used.

Example 8

To 100 mass parts of the PET, 5 mass parts of the ethylene/glycidyl methacrylate/methyl acrylate copolymer resin (trade name: Bondfast 7M, manufactured by Sumitomo Chemical Co., Ltd., glycidyl methacrylate=6 mass %) and 5 mass parts of an ethylene/methyl methacrylate copolymer (trade name: Acryft WK 307, manufactured by Sumitomo Chemical Co., Ltd.) were added simultaneously and mixed together as mentioned in the above, to obtain a resin dispersion, in which the PET was in a continuous phase and both of the ethylene/glycidyl methacrylate/methyl acrylate copolymer and the ethylene/methyl methacrylate copolymer were in a dispersed phase (the average diameter of dispersed particles: 0.37 μm).

An insulated wire of the present invention was obtained in the same manner as in Example 1, except that the thus-obtained resin dispersion was used.

Comparative Example 1

The PET was extruded to coat, onto a 0.4-mmφ copper wire preheated at 180° C., using a 30-mmφ extruder (extrusion condition: 210 to 280° C.), to obtain an insulated wire for comparison.

Comparative Example 2

To 100 mass parts of the PET, 10 mass parts of a resin, ethylene/acrylic acid copolymer EAA (trade name, manufactured by Dow Chemicals), were mixed, to obtain a resin composition.

An insulated wire for comparison was obtained in the same manner as in Comparative Example 1, except that the thus-obtained resin composition was used.

With respect to the insulated wires of the present invention and those of Comparative Examples, their properties were evaluated as follows. The results are shown in Table 1.

(1) Dielectric Breakdown Voltage

A twist pair of each of the electric wires and a copper wire was prepared, respectively, according to the sample preparing conditions of pair twisting method of JIS C 3003$^{-1999}$ 10. The dielectric breakdown voltage of the resultant wire pair immediately after preparation was measured.

(2) High-Temperature Dielectric Breakdown Voltage

A twist pair of each of the electric wires and a copper wire was prepared, according to the sample preparing conditions of pair twisting method of JIS C 3003$^{-1999}$ 10. The resultant wire pair was left under this state for 1 hour at 100° C., and then the dielectric breakdown voltage of the wire pair at 100° C. was measured.

(3) Change in Dielectric Breakdown Voltage with Lapse of Time

As an accelerated test of change in dielectric breakdown voltage with the lapse of time, each of the electric wires, left at 50° C. under 90% RH for 1 week, was utilized to prepare a twist pair of said electric wire and a copper wire, according to the sample preparing conditions of pair twisting method of JIS C 3003$^{-1999}$ 10. The dielectric breakdown voltage of the resultant wire pair was measured.

(4) Change in Flexibility with Lapse of Time

As an accelerated test of change in flexibility with the lapse of time, it was observed whether crazing had occurred to each of the electric wires left at 50° C. under 90% RH for 1 week, according to JIS C 3003$^{-1999}$ 7.

(5) Softening Test

Softening temperature of each of the insulated wires was measured, according to JIS C 3003$^{-1999}$ 11.

TABLE 1

|  | Example (1) | Example (2) | Example (3) | Example (4) | Example (5) | Example (6) | Example (7) | Example (8) | Comparative example (1) | Comparative example (2) |
|---|---|---|---|---|---|---|---|---|---|---|
| Coating thickness (μm) | 50 | 49 | 49 | 50 | 50 | 51 | 49 | 49 | 49 | 50 |

TABLE 1-continued

|  | Example (1) | Example (2) | Example (3) | Example (4) | Example (5) | Example (6) | Example (7) | Example (8) | Comparative example (1) | Comparative example (2) |
|---|---|---|---|---|---|---|---|---|---|---|
| Dielectric breakdown voltage [kV] immediately after preparation | 9.8 | 9.6 | 9.8 | 9.7 | 9.8 | 9.6 | 9.7 | 9.6 | 9.8 | 9.8 |
| Dielectric breakdown voltage [kV] at 100° C. | 6.7 | 7.7 | 7.1 | 7.2 | 6.4 | 5.9 | 7.8 | 6.7 | 4.4 | 5.4 |
| Dielectric breakdown voltage [kV] after leaving for 1 week at 50° C. 90% RH | 7.4 | 8.3 | 8.1 | 8.4 | 8.5 | 8.6 | 8.0 | 8.0 | 5.2 | 8.2 |
| Crazing after leaving for 1 week at 50° C. 90% RH | Not observed | Not observed | Not observed | Not observed | Not observed | Not observed | Not observed | Not observed | Observed | Not observed |
| Softening temp. (° C.) | 255 | 253 | 250 | 250 | 247 | 242 | 254 | 247 | 260 | 247 |

It can be understood from the results shown in Table 1 that the insulated wires obtained in Examples 1 to 8 could suppress degradation of dielectric breakdown voltage, which might be caused by occurrence of crazing, and they had superior values of the high-temperature dielectric breakdown voltage as compared to the insulated wires in Comparative Examples 1 or 2.

Example 9

To 100 mass parts of the PET (A), 6 mass parts of an ethylene/glycidyl methacrylate/methyl acrylate copolymer resin (B) (trade name: Bondfast 7M, manufactured by Sumitomo Chemical Co., Ltd., glycidyl methacrylate=6 mass %) and 9 mass parts of an ethylene/methyl methacrylate copolymer (C) (trade name: Acryft WK 307, manufactured by Sumitomo Chemical Co., Ltd.) were added simultaneously and mixed together, to obtain a resin dispersion, in which the PET was in a continuous phase and both of the ethylene/glycidyl methacrylate/methyl acrylate copolymer and the ethylene/methyl methacrylate copolymer were in a dispersed phase (the average diameter of dispersed particles: 0.50 μm).

Example 10

To 100 mass parts of the PET (A), 7.5 mass parts of the ethylene/glycidyl methacrylate/methyl acrylate copolymer resin (B) and 7.5 mass parts of the ethylene/methyl methacrylate copolymer (C) were added simultaneously and mixed together, to obtain a resin dispersion, in which the PET was in a continuous phase and both of the ethylene/glycidyl methacrylate/methyl acrylate copolymer and the ethylene/methyl methacrylate copolymer were in a dispersed phase (the average diameter of dispersed particles: 0.45 μm).

Example 11

To 100 mass parts of the PET (A), 9 mass parts of the ethylene/glycidyl methacrylate/methyl acrylate copolymer resin (B) and 6 mass parts of the ethylene/methyl methacrylate copolymer (C) were added simultaneously and mixed together, to obtain a resin dispersion, in which the PET was in a continuous phase and both of the ethylene/glycidyl methacrylate/methyl acrylate copolymer and the ethylene/methyl methacrylate copolymer were in a dispersed phase (the average diameter of dispersed particles: 0.34 μm).

Each of the resin dispersions obtained in the above-described Examples 2, 5 and 6 and Examples 9 to 11 was extruded, to obtain a film extrusion-molded product (thickness: about 50 μm). The thus-prepared molded products were observed with the naked eye whether granular structure (spitting) was formed on the product or not. The result are shown in Table 2.

TABLE 2

|  | Example 2 | Example 9 | Example 10 | Example 11 | Example 5 | Example 6 |
|---|---|---|---|---|---|---|
| Resin (A)* | 100 | 100 | 100 | 100 | 100 | 100 |
| Resin (B)* | 5 | 6 | 7.5 | 9 | 15 | 20 |
| Resin (C)* | 0 | 9 | 7.5 | 6 | 0 | 0 |

TABLE 2-continued

| | Example 2 | Example 9 | Example 10 | Example 11 | Example 5 | Example 6 |
|---|---|---|---|---|---|---|
| Particle size (μm) | 0.18 | 0.50 | 0.45 | 0.34 | 0.29 | 0.35 |
| Granular structure | Not observed | Not observed | Not observed | Not observed | Observed | Observed |

(Note)
*part(s) by mass

It can be understood from the results shown in Table 2 that the resin dispersions obtained in Examples 2 and 9 to 10 each could form a fine dispersed phase, and they each could give a film having a superior surface state, which had no formation of granular structure upon the extrusion-molding processing, as compared to Examples 5 and 6.

INDUSTRIAL APPLICABILITY

The insulated wire of the present invention is preferable for use, for example, in electric and electronic devices, machinery and tools, especially, for use as a winding in these devices, machinery and tools.

The resin dispersion of the present invention is preferable for use as an insulating coating layer material, for example, of the above insulated wire. Further, the resin dispersion of the present invention can suppress formation of granular structure upon extrusion-molding processing, and thus it is preferable as materials for molded products, e.g. films and bottles, with an excellent surface state.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An insulated wire consisting of one thin insulating layer composed of a resin dispersion, coated on a conductor, wherein the thickness of the thin insulating layer is 20 to 60 μm, and wherein the resin dispersion consists of:
a polyester-series resin (A) in a continuous phase; and
a resin (B) having a glycidyl ester compound of an unsaturated carboxylic acid represented by formula (1) and dispersed with an average particle diameter of 0.05 to 3 μm in the resin (A);

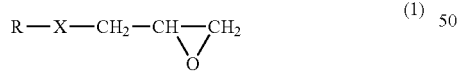

(1)

wherein R represents an alkenyl group having 2 to 18 carbon atoms and X represents a carbonyloxy group;
wherein the resin dispersion is a compound in which resin (B) is uniformly and finely dispersed in resin (A);
wherein the resin dispersion contains 1 to 10 mass parts of the resin (B), to 100 mass parts of the polyester-series resin (A); and
wherein the insulated wire has a dielectric breakdown voltage of from 6.7 to 7.8 kV after being left for 1 hour at 100° C.

2. The insulated wire according to claim 1, wherein the resin (B) is at least one selected from the group consisting of glycidyl acrylate, glycidyl methacrylate, and itaconic acid glycidyl ester.

3. The insulated wire according to claim 1, wherein the resin (B) is at least one selected from the group consisting of an ethylene/glycidyl methacrylate copolymer, an ethylene/glycidyl methacrylate/methyl acrylate terpolymer, an ethylene/glycidyl methacrylate/vinyl acetate terpolymer, and an ethylene/glycidyl methacrylate/methyl acrylate/vinyl acetate quarterpolymer.

4. The insulated wire according to claim 1, wherein the resin (B) is an ethylene/glycidyl methacrylate/methyl acrylate terpolymer.

5. The insulated wire according to claim 1, wherein the insulated wire has a softening temperature of 250° C. or more.

6. An insulated wire consisting of one thin insulating layer composed of a resin dispersion, coated on a conductor, wherein the thickness of the thin insulating layer is 20 to 60 μm, and wherein the resin dispersion consists of:
a polyester-series resin (A) in a continuous phase; and
a resin (B) having a glycidyl ester compound of an unsaturated carboxylic acid represented by formula (1),

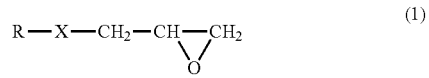

(1)

wherein R represents an alkenyl group having 2 to 18 carbon atoms and X represents a carbonyloxy group, and an olefin-series resin (C), each of which is dispersed with an average particle diameter of 0.05 to 3 μm in the resin (A);
wherein the olefin-series resin (C) is a copolymer composed of at least one component selected from the group consisting of an acrylic component and a vinyl component; and an olefin component;
wherein the resin dispersion is a compound in which resin (B) is uniformly and finely dispersed in resin (A);
wherein the resin dispersion contains 1 to 10 mass parts of the resin (B), and 5 to 10 mass parts of the olefin-series resin (C), to 100 mass parts of the polyester-series resin (A); and
wherein the insulated wire has a dielectric breakdown voltage of from 6.7 to 7.8 kV after being left for 1 hour at 100° C.

7. The insulated wire according to claim 6, wherein the insulated wire has a softening temperature of 250° C. or more.

8. The insulated wire according to claim 1 or 6, wherein the polyester-series resin (A) is a polymer obtained by condensation reaction of a dicarboxylic acid with a diol.

9. The insulated wire according to claim 1 or 6, wherein the resin (B) is a copolymer composed of an olefin component and an epoxy group-containing compound-component.

10. The insulated wire according to claim 1 or 6, wherein the resin (B) is a copolymer composed of an olefin component and an unsaturated carboxylic acid glycidyl ester component.

11. The insulated wire according to claim 1 or 6, wherein the resin (B) is a copolymer composed of at least one component selected from the group consisting of an acrylic component and a vinyl component; an olefin component, and an epoxy group-containing compound component.

12. The insulated wire according to claim 1 or 6, wherein the resin (B) is a copolymer composed of at least one component selected from the group consisting of an acrylic component and a vinyl component; an olefin component, and an unsaturated carboxylic acid glycidyl ester component.

* * * * *

UNITED STATES PATENT AND TRADEMARK OFFICE
CERTIFICATE OF CORRECTION

| | | |
|---|---|---|
| PATENT NO. | : 8,652,635 B2 | Page 1 of 1 |
| APPLICATION NO. | : 11/137367 | |
| DATED | : February 18, 2014 | |
| INVENTOR(S) | : Hideo Fukuda et al. | |

It is certified that error appears in the above-identified patent and that said Letters Patent is hereby corrected as shown below:

ON THE TITLE PAGE:

Insert the following:

-- Related U.S. Application Data

(63)  Continuation of application No. PCT/JP2003/015151, filed on Nov. 27, 2003. --.

At item (30), Foreign Application Priority Data, delete the following:

"Nov. 27, 2003   (WO) .................. PCT/JP03/15151".

Signed and Sealed this
Twenty-third Day of February, 2016

Michelle K. Lee
*Director of the United States Patent and Trademark Office*